(12) United States Patent
Wang et al.

(10) Patent No.: US 11,922,843 B2
(45) Date of Patent: *Mar. 5, 2024

(54) FLEXIBLE DISPLAY PANEL AND PREPARATION METHOD THEREFOR, AND DISPLAY DEVICE AND DISPLAY MODULE

(71) Applicants: Chengdu BOE Optoelectronics Technology Co., Ltd., Sichuan (CN); BOE Technology Group Co., Ltd., Beijing (CN)

(72) Inventors: Yaming Wang, Beijing (CN); Liqiang Chen, Beijing (CN); Dongdong Zhao, Beijing (CN); Zuojia Wang, Beijing (CN); Xueyan Liu, Beijing (CN); Xu Li, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/801,805

(22) PCT Filed: Jun. 18, 2021

(86) PCT No.: PCT/CN2021/101016
§ 371 (c)(1),
(2) Date: Aug. 24, 2022

(87) PCT Pub. No.: WO2022/012270
PCT Pub. Date: Jan. 20, 2022

(65) Prior Publication Data
US 2023/0111683 A1    Apr. 13, 2023

(30) Foreign Application Priority Data
Jul. 17, 2020  (CN) .......................... 202010690435.9

(51) Int. Cl.
*G09G 3/00*    (2006.01)
*G06F 1/16*    (2006.01)

(52) U.S. Cl.
CPC .......... *G09G 3/035* (2020.08); *G06F 1/1652* (2013.01); *G09G 2300/04* (2013.01)

(58) Field of Classification Search
CPC ............ H10K 77/111; H10K 2102/311; H10K 71/00; H10K 59/00–095; G06F 1/1652;
(Continued)

(56) References Cited

U.S. PATENT DOCUMENTS 9,407,740 B2    8/2016  Allore et al.
10,903,299 B2    1/2021  Shim et al.
(Continued)

FOREIGN PATENT DOCUMENTS

CN    105204235 A    12/2015
CN    105492991 A    4/2016
(Continued)

OTHER PUBLICATIONS

International Search Report and Written Opinion dated Sep. 26, 2021, in corresponding PCT/CN2021/101016, 9 pages.
(Continued)

*Primary Examiner* — Sanjiv D. Patel
(74) *Attorney, Agent, or Firm* — XSENSUS LLP

(57) ABSTRACT

A flexible display panel and a preparation method therefor, and a display device and a display module are provided. The flexible display panel includes a planar area, a first bending area, a second bending area and a corner bending area. The corner bending area is connected to a corner of the planar area and is connected between the first bending area and the second bending area, and is provided with a plurality of first hole groups, where the corner bending area is bent with a width of a first hole group in middle of the corner bending
(Continued)

area increasing and a width of a first hole group in an edge area on a side of the corner bending area away from the planar area decreasing.

20 Claims, 11 Drawing Sheets

(58) Field of Classification Search
CPC .... G06F 1/1601; G06F 1/1637; G06F 1/1641; G06F 1/1656; G06F 1/1633; G06F 1/1628; G06F 1/1626; G06F 1/1622; G06F 1/16; G06F 1/1613
See application file for complete search history.

(56) References Cited

U.S. PATENT DOCUMENTS

| | | | |
|---|---|---|---|
| 10,939,547 | B2 | 3/2021 | Lee et al. |
| 2010/0011641 | A1 | 1/2010 | Hill |
| 2014/0065430 | A1 | 3/2014 | Yamazaki et al. |
| 2016/0021226 | A1 | 1/2016 | Allore et al. |
| 2019/0081127 | A1 | 3/2019 | Shim et al. |
| 2019/0269011 | A1 | 8/2019 | Lee et al. |
| 2019/0320049 | A1* | 10/2019 | Nam ............... H04M 1/185 |
| 2020/0136069 | A1 | 4/2020 | Paek et al. |
| 2020/0176696 | A1* | 6/2020 | Dai ............... H10K 59/131 |
| 2020/0219959 | A1* | 7/2020 | Fang ............... H10K 59/126 |
| 2021/0013434 | A1 | 1/2021 | Cao et al. |
| 2021/0153363 | A1 | 5/2021 | Cao et al. |
| 2021/0165454 | A1 | 6/2021 | Dong et al. |
| 2021/0234120 | A1 | 7/2021 | Zhang et al. |

FOREIGN PATENT DOCUMENTS

| | | | |
|---|---|---|---|
| CN | 108108062 | A | 6/2018 |
| CN | 108615463 | A | 10/2018 |
| CN | 108667960 | A | 10/2018 |
| CN | 108766242 | A | 11/2018 |
| CN | 108766977 | A | 11/2018 |
| CN | 109032251 | A | 12/2018 |
| CN | 109166459 | A | 1/2019 |
| CN | 208351035 | U | 1/2019 |
| CN | 109599402 | A | 4/2019 |
| CN | 109616017 | A | 4/2019 |
| CN | 109950184 | A | 6/2019 |
| CN | 110010013 | A | 7/2019 |
| CN | 110048020 | A | 7/2019 |
| CN | 110085128 | A | 8/2019 |
| CN | 110189631 | A | 8/2019 |
| CN | 110518039 | A | 11/2019 |
| CN | 110767096 | A | 2/2020 |
| CN | 110943114 | A | 3/2020 |
| CN | 10992828 | A | 4/2020 |
| CN | 110048020 | B | 4/2020 |
| CN | 110992827 | A | 4/2020 |
| CN | 110992828 | A | 4/2020 |
| CN | 110992831 | A | 4/2020 |
| CN | 111008501 | A | 4/2020 |
| CN | 111179777 | A | 5/2020 |
| CN | 111276496 | A | 6/2020 |
| CN | 111312080 | A | 6/2020 |
| CN | 111681547 | A | 9/2020 |
| CN | 111710245 | A | 9/2020 |
| KR | 2004-0067257 | A | 7/2004 |
| KR | 10-2126863 | B1 | 6/2020 |
| WO | 2020/206984 | A1 | 10/2020 |

OTHER PUBLICATIONS

Office Action dated Aug. 23, 2022, in corresponding Chinese patent Application No. 202010690435.9, 19 pages.
Juhn S. Yoo et al., "Technological Considerations for Manufacturing Flexible Active-Matrix OLED Displays", Advanced Display, pp. 21-24 and 49, total 5 pages, Feb. 2009, with English abstract.
"Mechanical Stress Test Methods of Flexible Display Devices—Interpretation of Standard IEC 62715-6-1:2014", Electrical Appliances, Dec. 2014, pp. 87-90, total 4 pages, with English abstract.
Notice of Allowance dated Feb. 18, 2022, in corresponding Chinese patent Application No. 202010690435.9, 7 pages.
International Search Report dated Sep. 7, 2021, in corresponding PCT/CN2021/099220, 2 pages.
Office Action dated Aug. 27, 2021, in corresponding Chinese patent Application No. 202010522838.2, 20 pages.
Notice of Allowance dated Feb. 9, 2022, in corresponding Chinese patent Application No. 202010522838.2, 4 pages.

* cited by examiner

FLEXIBLE DISPLAY PANEL AND PREPARATION METHOD THEREFOR, AND DISPLAY DEVICE AND DISPLAY MODULE

CROSS-REFERENCE TO RELATED APPLICATIONS

The present disclosure is a national phase entry under 35 U.S.C. § 371 of International Application No. PCT/CN2021/101016, filed on Jun. 18, 2021 and claims priority of Chinese Patent Application No. 202010690435.9, filed on Jul. 17, 2020, and entitled "FLEXIBLE DISPLAY PANEL AND PREPARATION METHOD THEREFOR, DISPLAY DEVICE, AND DISPLAY MODULE," the entire disclosures of which are incorporated herein by reference in their entireties.

TECHNICAL FIELD

The present disclosure relates to the field of display technology, and in particular, to a flexible display panel and a method for preparing the flexible display panel, a display device including the flexible display panel, and a display module including the flexible display panel.

BACKGROUND

With the rapid development of display technology, the trend towards aesthetics and thinness of electronic products is gradually emerging, and curved surface lamination of Organic Light-Emitting Diode (OLED) flexible displays is also developing rapidly. With the maturity of two-sided curved surface lamination process of the OLED flexible display, the four-sided curved surface lamination of the OLED flexible display is increasingly favored by panel manufacturers and cell phone manufacturers.

However, there is a technical difficulty in the four-sided curved surface lamination of the OLED flexible display, which is the corner lamination. With the increase of the depth of the OLED flexible display into the corner arc area of the cover, the force of the OLED flexible display becomes more complicated. After the corners of the OLED flexible display are laminated, the middle area of the screen corners is subject to greater radial and tangential tensile stress, resulting in the maximum tensile stress is greater than the maximum tensile stress on the long side and short side, which is more likely to produce cracks. The edge area of the screen corners is subjected to larger tangential compressive stress, which is prone to wrinkles. In addition, due to the design of the mechanism equipment and the flexible display panel, the profiling of the flexible display is often not sufficient when the four sides of the OLED flexible display are curved to be laminated, and the four corners of the flexible display will be lifted, resulting in pre-contact often occurs when the flexible display and cover are laminated, that is, the edge of the flexible display contacts the cover first, and then contacts internally to form bubbles. In this way, after lamination and de-bubbling, it is also likely to produce cracks, resulting in poor lamination.

It should be noted that the information disclosed in the background section above is only used to enhance the understanding of the background of the present disclosure, and therefore may include information that does not constitute the prior art known to those of ordinary skill in the art.

SUMMARY

The present disclosure provides a flexible display panel and a method for preparing the flexible display panel, a display device including the flexible display panel, and a display module including the flexible display panel.

According to one aspect of the present disclosure, there is provided a flexible display panel including: a planar area; a first bending area connected to a first edge of the planar area along a first direction; a second bending area connected to a second edge of the planar area along a second direction, the second direction being at a set angle to the first direction; and a corner bending area connected to a corner of the planar area and connected between the first bending area and the second bending area, and provided with a plurality of first hole groups, where the corner bending area is bent with a width of a first hole group in middle of the corner bending area increasing and a width of a first hole group in an edge area on a side of the corner bending area away from the planar area decreasing.

According to one aspect of the present disclosure, there is provided a display device including the flexible display panel as described above.

According to one aspect of the present disclosure, there is provided a method for preparing the flexible display panel as described above, which includes: forming a plurality of first hole groups in the corner bending area by two etching processes, wherein the corner bending area is bent with a width of a first hole group in middle of the corner bending area increasing and a width of a first hole group in an edge area on a side of the corner bending area away from the planar area decreasing.

According to one aspect of the present disclosure, there is provided a display module including: a cover; the flexible display panel according to any one of the above embodiments; and a carrier film for carrying the flexible display panel when the flexible display panel is laminated to the cover. The carrier film comprises: a plane carrying area for carrying the planar area of the flexible display panel; a first bending and carrying area connected to a first edge of the plane carrying area in a first direction, for carrying a first bending area of the flexible display panel; a second bending and carrying area connected to a second edge of the plane carrying area in a second direction, for carrying a second bending area of the flexible display panel, the second direction being at a set angle to the first direction and a corner bending and carrying area connected to a corner of the plane carrying area, for carrying a corner bending area of the flexible display panel, wherein a space is provided between the corner bending and carrying area and the first bending and carrying area, and a space is provided between the corner bending and carrying area and the second bending and carrying area.

Other features and advantages of the present disclosure will become apparent through the following detailed description, or will be learned in part through the practice of the present disclosure.

It should be understood that both the foregoing general description and the following detailed description are exemplary and explanatory only and not for limiting the present disclosure.

BRIEF DESCRIPTION OF THE DRAWINGS

Accompanying drawings herein, which are incorporated in the specification and constitute a part of the present specification, illustrate embodiments conforming to the present disclosure, and are used to explain the principles of the present disclosure together with the specification. It is apparent that the accompanying drawings described below are only some embodiments of the present disclosure, and other accompanying drawings can also be obtained according to these accompanying drawings without any creative efforts by those skilled in the art.

DETAILED DESCRIPTION

Figure 1:
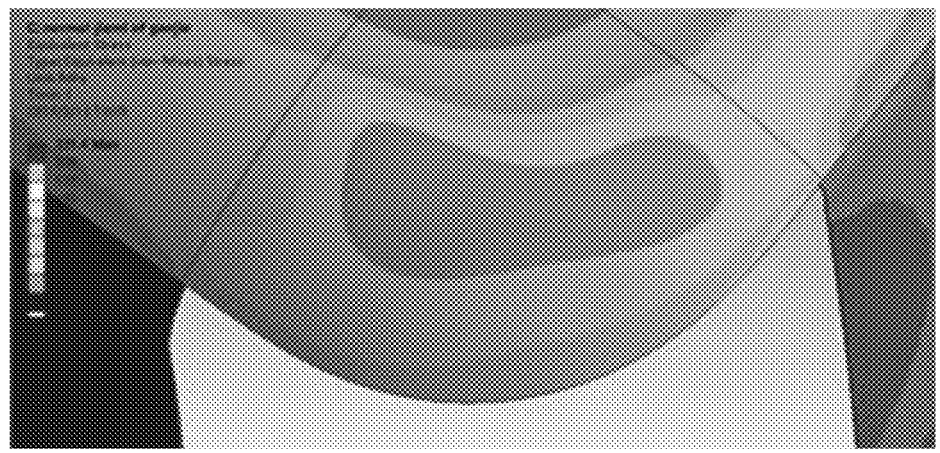
FIG. 1 is a simulation schematic diagram of the stress distribution in the corner bending area after the lamination of the flexible display panel is completed in the related art.

Embodiments will now be described more fully with reference to the accompanying drawings. However, the embodiments can be implemented in a variety of forms and should not be construed as being limited to the embodiments set forth herein; rather, the provision of these embodiments allows the application to be comprehensive and complete and communicates the ideas of the embodiments in a comprehensive manner to those skilled in the art. The same reference numerals in the drawings indicate identical or similar structures, and thus their detailed description will be omitted.

Figure 2:
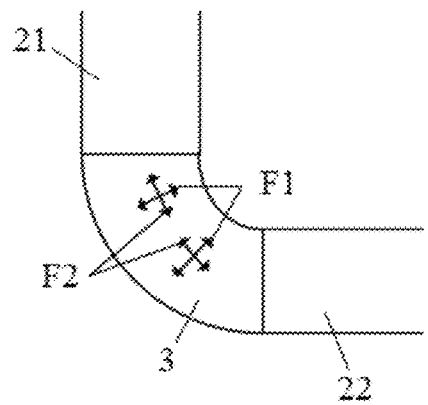
FIG. 2 is a schematic diagram of the force analysis in the middle of the corner bending area after the lamination of the flexible display panel is completed in the related art.
Figure 3:
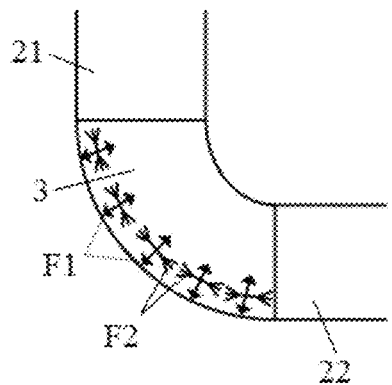
FIG. 3 is a schematic diagram of the force analysis in the middle of the corner bending area after the lamination of the flexible display panel is completed in the related art.

Referring to the simulation diagram of the stress distribution in the corner bending area 3 after the lamination of the flexible display panel in the related art shown in FIG. 1, this figure illustrates that the maximum tensile stress is concentrated in the middle area of the corner bending area 3 of the flexible display panel. Referring to the schematic diagram of the stress analysis in the middle of the corner bending area 3 after the lamination of the flexible display panel in the related art shown in FIG. 2, this figure illustrates that the stress is divided into radial force F1 and tangential force F2, Referring to the schematic diagram of the stress analysis in the middle of the corner bending area 3 after the lamination of the flexible display panel in the related art shown in FIG. 3, this figure illustrates that the maximum compressive stress is concentrated in the edge area of the corner bending area 3 of the flexible display panel, and the radial force F1 is the tensile force and the tangential force F2 is the pressure in the edge area of the corner bending area 3.

Figure 4:
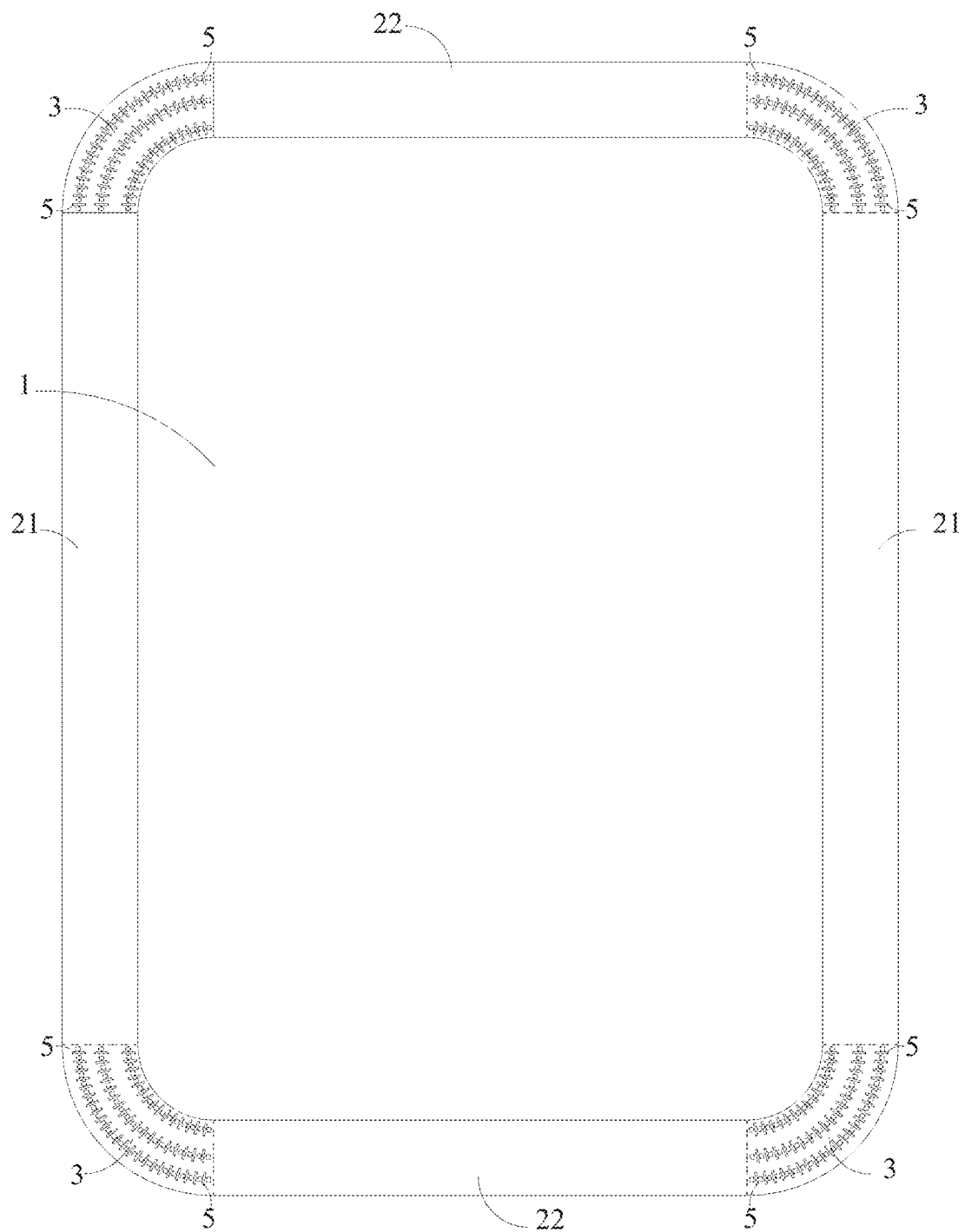
FIG. 4 is a structural schematic diagram of a flexible display panel according to a first embodiment of the present application.

The present application first provides a flexible display panel. Referring to the structural schematic diagram of a flexible display panel according to an embodiment of the present application shown in FIG. 4, the flexible display panel may include a planar area 1, a first bending area 21, a second bending area 22 and a corner bending area 3. The first bending area 21 is connected to a first edge of the planar area 1 in a first direction. The second bending area 22 is connected to a second edge of the planar area. 1 in a second direction, the second direction being at a set angle to the first direction. The corner bending area 3 is connected to a corner of the planar area 1 and is connected between the first bending area 21 and the second bending area 22. The corner bending area 3 is provided with a plurality of first hole groups 5, where the corner bending area is bent with a width of a first hole group 5 in the middle of the corner bending area 3 increasing and a width of a first hole group 5 in an edge area on a side of the corner bending area 3 away from the planar area 1 decreasing.

In this embodiment, the edge area of the corner bending area 3 refers to the area of an arc-shaped edge, away from the planar area 1, of the corner bending area 3. The tangential direction is the direction perpendicular to the radial direction.

In this embodiment, the flexible display panel can be provided as a rectangle with rounded corners, and all four edges and four corners of the flexible display panel are to be bent to form a curved surface.

The planar area 1 may be provided in the middle of the flexible display panel, and the planar area 1 may also be provided as a rectangle with rounded corners. The planar area 1 has four straight edges and four rounded edges. The four straight edges may include two long edges and two wide edges.

Two first bending areas 21 and two second bending areas 22 are correspondingly connected to the four straight edges of the planar area 1. The first bending area 21 may be a long-edge bending area, the first edge may be the long edge of the planar area 1, and the first direction may be the length direction of the planar area 1. The two first bending areas 21 are connected to the two first edges of the planar area 1 along the first direction, i.e. the two first bending areas 21 are connected to the two long edges of the planar area 1 along the length direction. The second bending area 22 may be a wide-edge bending area, the second edge may be a wide edge of the planar area 1, and the second direction may be the width direction of the planar area 1. The two second bending areas 22 are connected to the two second edges of the planar area 1 along the second direction, i.e. the two second bending areas 22 are connected to the two wide edges of the planar area 1 along the width direction.

The first bending area 21 and the second bending area 22 have the same width, the length of the first bending area 21 is the same as the length of the first edge, and the length of the second bending area 22 is the same as the length of the second edge.

Of course, it should be understood that the flexible display panel can be designed as a right-angle rectangle, a rounded square, a right-angle square, etc., and can also be designed as a trapezoid, a parallelogram, etc., as required.

In this embodiment, the corner bending area 3 is connected to the corner of the planar area 1, that is, the corner bending area 3 is connected to the arc-shaped edge of the planar area 1, and the corner bending area 3 is connected between the first bending area 21 and the second bending area 22. Specifically, the corner bending area 3 is provided in the shape of a quarter circle, the inner circle of the corner bending area 3 is connected to the arc-shaped edge of the planar area 1, and the two straight edges of the corner bending area 3 are connected to the first bending area 21 and the second bending area 22, respectively. The length of the straight edge of the corner bending area 3 is the same as the width of the first bending area 21 and the width of the second bending area 22, so that the outer circle of the corner bending area 3 is tangent to the first bending area 21 and the second bending area 22 and has a smooth transition.

In addition, it should be noted that the corner bending area 3 can also be provided as a notched square. In the case where the flexible display panel can be provided as a right-angle rectangle, a right-angle square, a trapezoid, a parallelogram, etc., the corner bending area 3 can be provided in a sector shape, a parallelogram, or a square.

Figure 5:
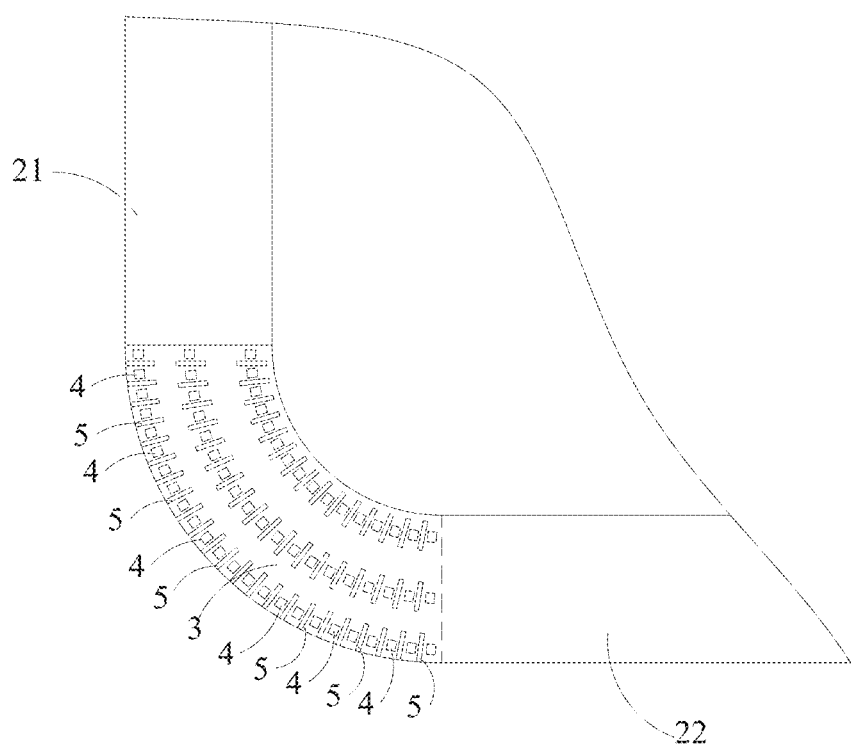
FIG. 5 is a structural schematic diagram of the partially enlarged structure of the corner bending area shown in FIG. 4.

In this embodiment, referring to FIG. 5, a plurality of first hole groups 5 are provided in the corner bending area 3, and the first hole groups 5 may be via holes or blind holes. The plurality of first hole groups 5 can be arranged to form three rows, and the arrangement direction of each row of first hole groups 5 can be the same as the extension direction of the edge of the corner bending area 3 away from the planar area 1, that is, each row of first hole groups 5 can be arranged to form a circular arc. Of course, the plurality of first hole groups 5 can be arranged to form two rows, four rows, five rows or more rows. The arrangement direction of each row of first hole groups 5 can also be the same as the extension direction of the edge of the corner bending area 3 connecting the planar area 1.

Figure 11:
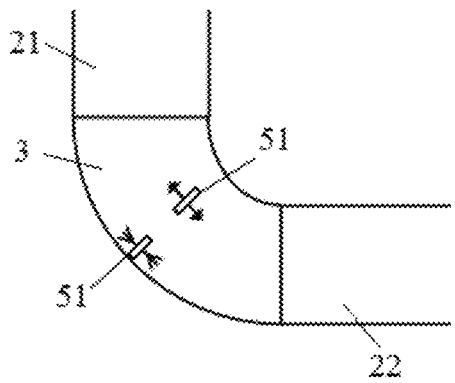
FIG. 11 is a schematic diagram of the force state of the hole groups in the middle and edge areas of the corner bending area after the lamination of the flexible display panel of the present application.
Figure 12:
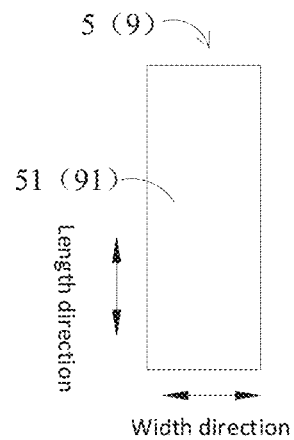
FIGS. 12-16 are structural schematic diagrams of various embodiments in which the first hole group and the second hole group of the flexible display panel of the present application include one hole.
Figure 13:
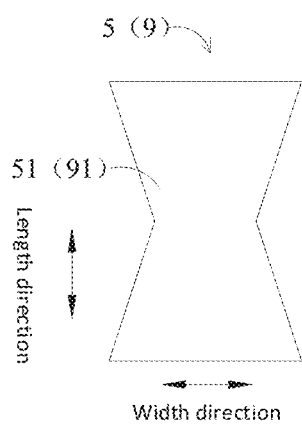
Figure 14:
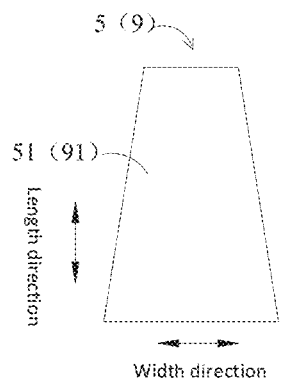
Figure 15:
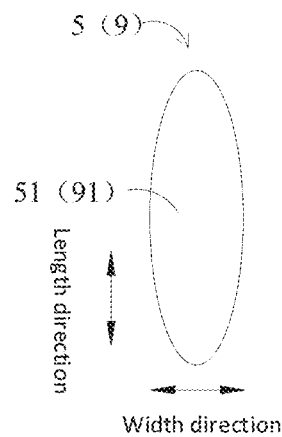
Figure 16:
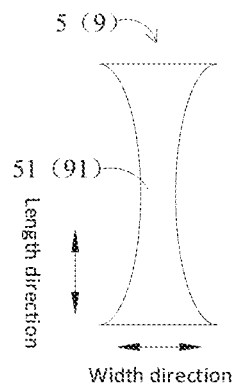

The first hole group 5 is provided in a strip shape so that the first hole group 5 has a length direction and a width direction, and the width direction is perpendicular to the length direction, i.e., whether the first hole group 5 includes one hole or includes multiple holes, the overall shape formed by the first hole group 5 is a strip. The length direction of the first hole group 5 is consistent with the radial direction of the corner bending area 3, i.e., the length direction of the first hole group 5 is provided along the radial direction of the corner bending area 3. One pixel 4 is arranged on one side of the first hole group 5, i.e., at least one pixel 4 is provided between two adjacent first hole groups in the direction perpendicular to the radial direction. Referring to FIG. 11, the first hole group 5 (i.e., the first hole 51) in the middle of the corner bending area 3 after the corner bending area 3 is bent is tangentially dilated to increase the width of the first hole group 5, and the first hole group 5 (i.e., the first hole 51) in the edge area of the corner bending area 3 is tangentially contracted to decrease the width of the first hole group 5.

In this embodiment, the first hole groups close to the edge of the flexible display panel are channeled to the edge of the flexible display panel so as to form a plurality of notches at the edge of the flexible display panel. That is, the first hole groups close to the edge of the flexible display panel are opening holes and the side walls of the holes have openings, which avoids the formation of wrinkles on the edges of the flexible display panel. Of course, the first hole groups close to the edge of the flexible display panel may not be channeled to the edge of the flexible display panel.

In addition, it should be noted that two or more pixels 4 can be arranged on both sides of the first hole group 5 in the width direction, and no pixel 4 can be provided between two first hole groups 5 adjacent to each other in the tangential direction, i.e., there are two first hole groups 5 provided between two adjacent pixels 4.

Further, the length direction of the first hole group 5 may not be aligned with the radial direction of the corner bending area 3, and may be set at a slight inclination relative to the radial direction, e.g., the inclination angle may be less than or equal to 30 degrees.

Figure 6:
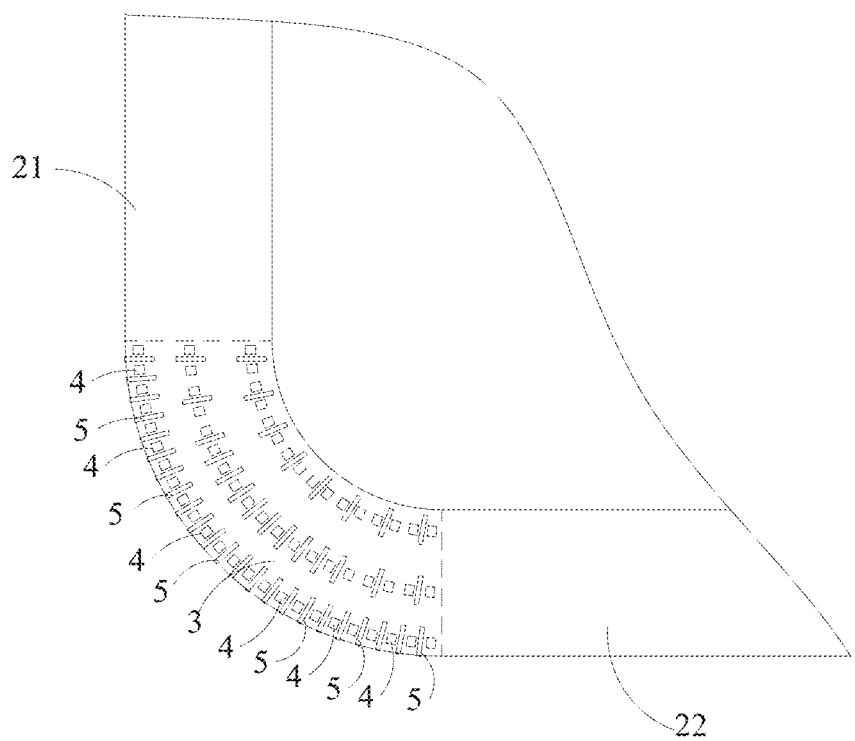
FIG. 6 is a structural schematic diagram of a corner bending area of a flexible display panel according to a second embodiment of the present application.

Referring to FIG. 6, in the second embodiment of the present application, the width of the first hole group 5 in the middle of the corner bending area 3 and the width of the first hole group 5 in the edge area of the corner bending area 3 is greater than the width of the first hole group 5 in the remaining part of the corner bending area other than the middle or the edge area of the corner bending area. Since the middle of the corner bending area 3 is subjected to a large tensile force after being bent, the width of the first hole group 5 in the middle of the corner bending area 3 is set to be larger, which may range from 10 microns to microns. Since the edge area of the corner bending area 3 is subjected to a higher pressure after being bent, the width of the first hole group 5 in this area is set to be larger, which may range from 10 microns to 20 microns.

Figure 7:
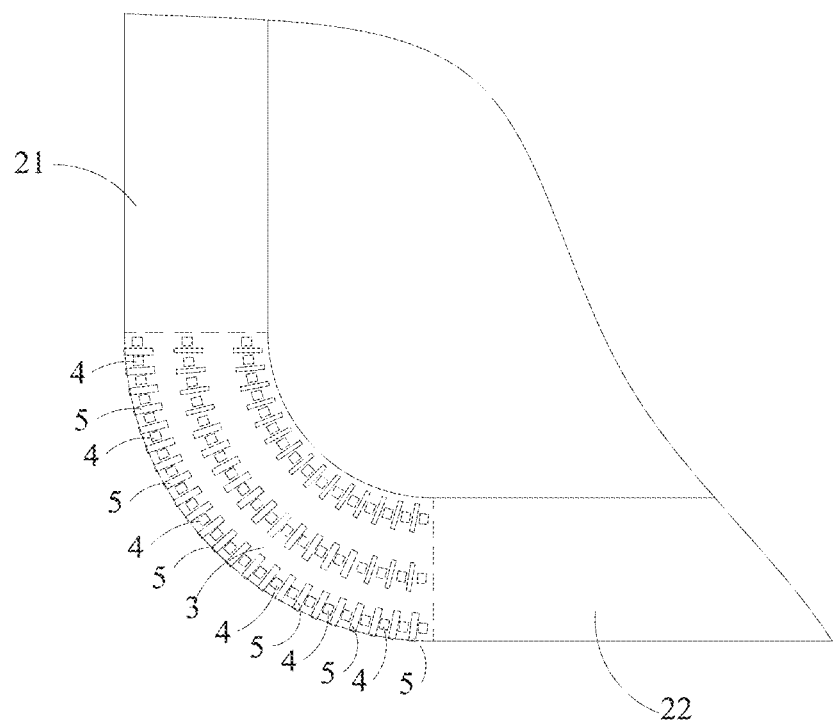
FIG. 7 is a structural schematic diagram of a corner bending area of a flexible display panel according to a third embodiment of the present application.

Referring to FIG. 7, in the third embodiment of the present application, the density of the first hole groups 5 in the middle and the edge area of the corner bending area 3 is greater than the density of the first hole group 5 in the remaining part of the corner bending area other than the middle or the edge area of the corner bending area. Since the tensile stress in the middle of the corner bending area 3 is large and the compressive stress in the edge area of the corner bending area 3 is large, the density of the first hole groups 5 in the middle and the edge area of the corner bending area 3 is set larger, which may range from 40 groups/mm$^2$ to 100 groups/mm$^2$. The first hole groups 5 are set denser to reduce the compressive stress in the edge area and the tensile stress in the middle.

Figure 8:
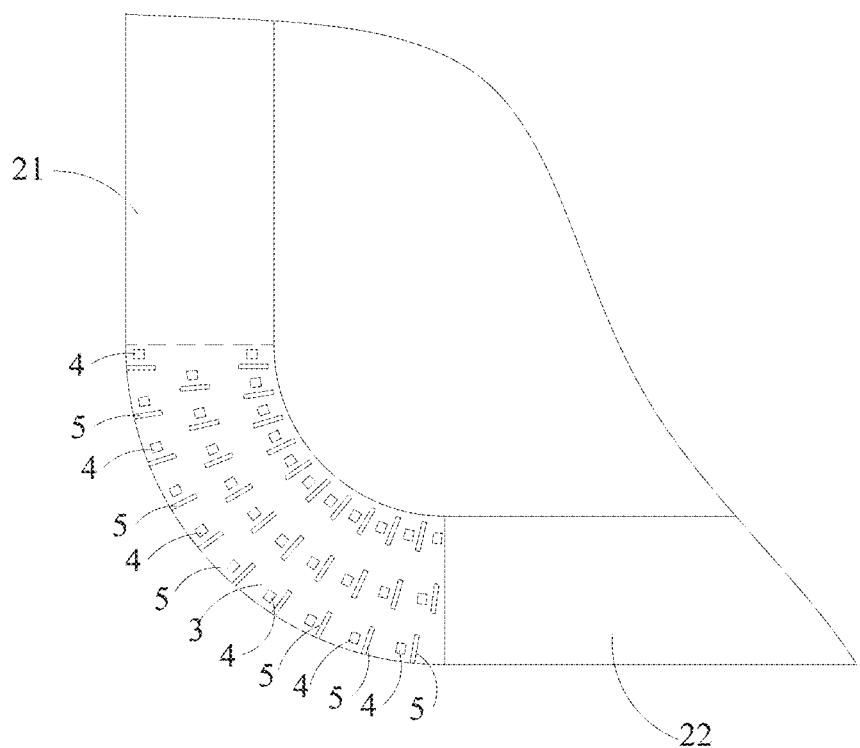
FIG. 8 is a structural schematic diagram of a corner bending area of a flexible display panel according to a fourth embodiment of the present application.

Referring to FIG. 8, in the fourth embodiment of the present application, the first center lines of two first hole groups 5 adjacent to each other in the radial direction may be staggered, i.e., the two adjacent first hole groups 5 are staggered with each other. The first center line extends in the same direction as the length direction of the first hole group 5. Of course, the first center lines of the two first hole groups 5 adjacent to each other in the radial direction may also be aligned in the same radial direction, so that the first hole groups 5 are neatly arranged in the radial direction. There is a distance between two first hole groups 5 adjacent to each other in the radial direction.

Figure 9:
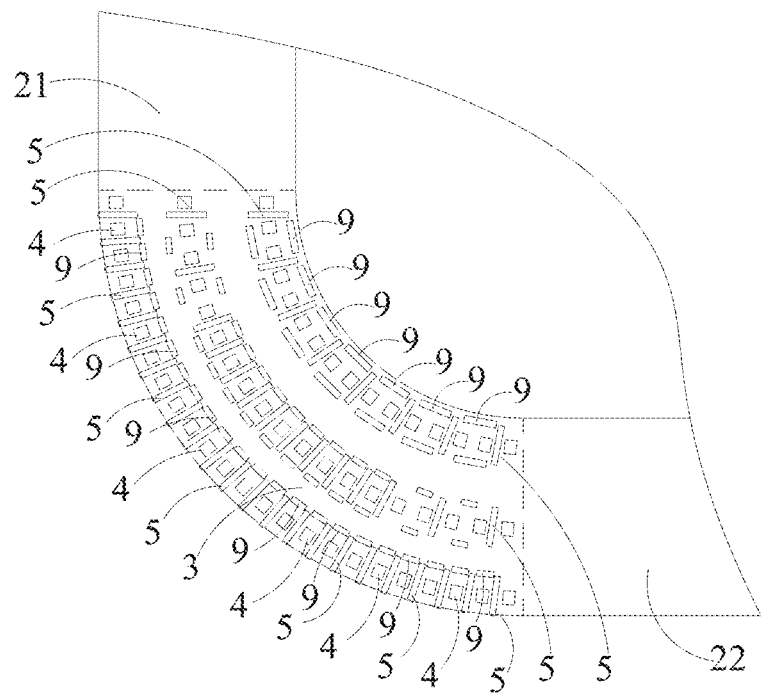
FIG. 9 is a structural schematic diagram of a corner bending area of a flexible display panel according to a fifth embodiment of the present application.

Referring to FIG. 9, in the fifth embodiment of the present application, a plurality of second hole groups 9 are provided in the corner bending area, and the plurality of second hole groups 9 are arranged to form five rows, and the arrangement direction of each row of second hole groups 9 is the same as the extension direction of the edge of the side of the corner bending area 3 away from the planar area 1, i.e., the arrangement of each row of second hole groups 9 forms a circular arc. Of course, the plurality of second hole groups 9 are arranged to form two rows, three rows, four rows, six rows or more rows. The arrangement direction of each row of second hole groups 9 can also be the same as the extension direction of the edge of the corner bending area 3 connecting the planar area 1.

The second hole group 9 is provided in a strip shape so that the second hole group 9 has a length direction and a width direction, and the width direction is perpendicular to the length direction, e, whether the second hole group 9 includes one hole or includes multiple holes, the overall shape formed by the second hole group 9 is a strip. The second center line of the second hole group 9 is consistent with the radial direction, and the second center line extends in the same direction as the width direction of the second hole group 9. The second hole groups 9 are arranged in a tangential direction, the two first hole groups adjacent to each other in the tangential direction and the two second hole groups 9 adjacent to each other in the radial direction surround to form a trapezoid, and there is a pixel provided in the trapezoid. Of course, a plurality of pixels may be provided in the trapezoid. After the corner bending area 3 is bent, the second hole group 9 in the middle of the corner bending area 3 is pulled and expanded in the radial direction to increase the width of the second hole group 9, and the second hole group 9 at the edge of the corner bending area 3 is pressed in the tangential direction to increase the width of the second hole group 9.

In addition, it should be noted that two or more pixels 4 can be arranged on both sides of the second hole group 9 in the width direction, and no pixel 4 can be provided between two second hole groups 9 adjacent to each other in the tangential direction, i.e., there are two second hole groups 9 provided between two adjacent pixels 4.

Referring to FIG. 9, the width of the second hole group 9 in the middle of the corner bending area 3 and the width of the second hole group 9 in the edge area of the corner bending area 3 is greater than the width of the second hole group 9 in the remaining part of the corner bending area other than the middle or the edge area of the corner bending area. Since the middle of the corner bending area 3 is subjected to a large tensile force after being bent, the width of the second hole group 9 in the middle of the corner bending area 3 is set to be larger, Which may range from 10 microns to 20 microns. Since the edge area of the corner bending area 3 is subjected to a higher pressure after being bent, the width of the second hole group 9 in this area is set to be larger, which may range from 10 microns to 20 microns.

Figure 10:
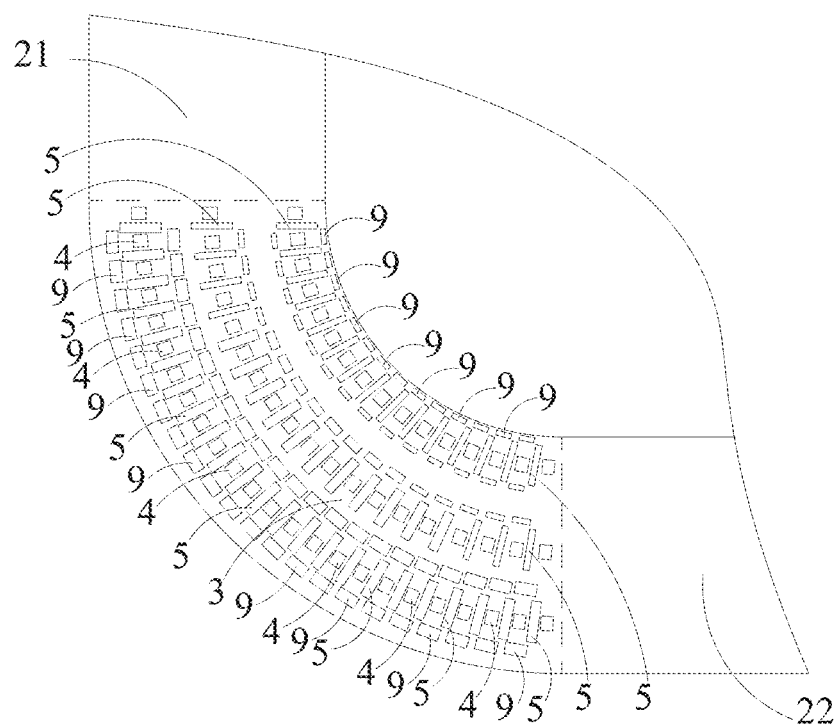
FIG. 10 is a structural schematic diagram of a corner bending area of a flexible display panel according to a sixth embodiment of the present application.

Referring to FIG. 10, in the sixth exemplary embodiment of the present application, the density of the second hole groups 9 in the middle and the edge area of the corner bending area 3 is greater than the density of the second hole groups 9 in the remaining part of the corner bending area other than the middle or the edge area of the corner bending area. Since the tensile stress in the middle of the corner bending area 3 is large and the compressive stress in the edge area of the corner bending area 3 is large, the density of the second hole groups 9 in the middle and the edge area of the corner bending area 3 is set larger, which may range from 40 groups/mm$^2$ to 100 groups/mm$^2$. The second hole groups 9 are set denser to reduce the compressive stress in the edge area and the tensile stress in the middle.

The second center lines of two second hole groups 9 adjacent to each other in the radial direction may be staggered, i.e., the two adjacent second hole groups 9 are staggered with each other. The second center line extends in the same direction as the width direction of the second hole group 9. Of course, the second center lines of two second hole groups 9 adjacent to each other in the radial direction may also be aligned in the same radial direction, so that the second hole groups 9 are neatly arranged in the radial direction.

In this embodiment, the wires between two adjacent first hole groups 5 and along the radial direction are set as curved wires. The wires can be metal wires or non-metallic wires for transmitting signals for each pixel 4. The wire is set as a curve to enhance the stretchability of the wire and reduce the stress after stretching. Alternatively, the metal wire may be designed to be curved when passing through the mesh perforated area to increase stretchability.

In this embodiment, the length of the first hole group 5 refers to the maximum dimension of the first hole group 5 in the length direction, and the width of the first hole group 5 refers to the maximum dimension of the first hole group 5 in the width direction. The length of the second hole group 9 refers to the maximum dimension of the second hole group in the length direction, and the width of the second hole group 9 refers to the maximum dimension of the second hole group 9 in the width direction.

In this embodiment, referring to the structural schematic diagrams of various embodiments in which the first hole group and the second hole group include one hole shown in FIGS. 12-16. The first hole group 5 may include one first hole 51, and a cross section of the first hole 51 may be rectangular. Of course, in other embodiments of the present application, the cross section of the first hole 51 may be elliptical, or trapezoidal, etc. The cross section of the first hole 51 may also be two symmetrically connected trapezoids, with the long-bottom edges of the two trapezoids set opposite each other and the short-bottom edges connected to each other. The cross section of the first hole 51 may also be a shape enclosed by two opposite straight lines and two opposite curves, and the two opposite curves concave to the inside of the hole. The width of the first hole group 5 can be greater than or equal to 5 μm and less than or equal to 20 μm, the length can be greater than or equal to 100 μm and less than or equal to 1000 μm, the depth can be greater than or equal to 20 μm and less than or equal to 60 μm, the distance between two first hole groups 5 adjacent to each other in the radial direction can be greater than or equal to 150 μm and less than or equal to 1200 μm, and the distance between two first hole groups 5 adjacent to each other in the tangential direction can be greater than or equal to 150 μm and less than or equal to 1200 μm. The perforation density of the first hole groups 5 may be greater than or equal to 4 groups/mm$^2$ and less than or equal to 100 groups/mm$^2$. The second hole group 9 may include one second hole 91, and a cross section of the second hole 91 may be rectangular. Of course, in other embodiments of the present application, the cross section of the second hole 91 may, be elliptical, or trapezoidal, etc. The cross section of the second hole 91 may also be two symmetrically connected trapezoids, with the long-bottom edges of the two trapezoids set opposite each other and the short-bottom edges connected to each other. The cross section of the second hole 91 may also be a shape enclosed by two opposite straight lines and two opposite curves, and the two opposite curves concave to the inside of the hole. The width of the second hole group 9 can be greater than or equal to Sum and less than or equal to 20 μm, the length can be greater than or equal to 100 μm and less than or equal to 1000 μm, the depth can be greater than or equal to 20 μm and less than or equal to 60 μm, the distance between two second hole group 9 adjacent to each other in the radial direction can be greater than or equal to 150 μm and less than or equal to 1200 μm, and the distance between two second hole group 9 adjacent to each other in the tangential direction can be greater than or equal to μm and less than or equal to 1200 μm. The perforation density of the second hole groups 9 may be greater than or equal to 4 groups/mm$^2$ and less than or equal to 100 groups/mm$^2$.

Figure 18:
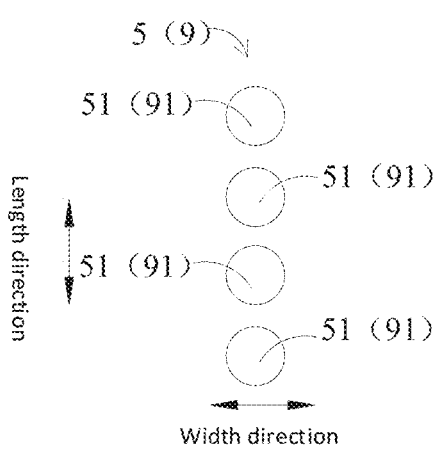
FIG. 18 is a structural schematic diagram in which the first hole group and the second hole group include a plurality of holes according to another embodiment.

In addition, referring to the structural schematic diagram of an embodiment in which the first hole group and the second hole group include a plurality of holes shown in FIG. 18. The first hole group 5 may include four first holes 51, the four first holes 51 are arranged along the length of the first hole group 5, and the cross section of the first hole 51 is circular. Of course, the first hole group 5 can also include two, three, five or more first holes 51, and the cross section of the first hole 51 can also be rectangular, or elliptical, etc. The second hole group 9 may include four second holes 91, the four second holes 91 are arranged along the length of the second hole group 9, and the cross section of the second hole 91 is circular. Of course, the second hole group 9 may also include two, three, five or more second holes 91, and the cross section of the second hole 91 may also be rectangular, or elliptical, etc.

Figure 17:
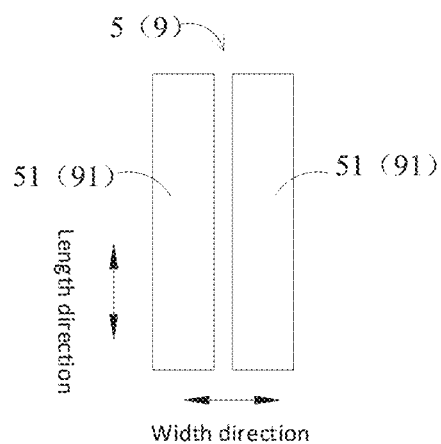
FIG. 17 is a structural schematic diagram in which the first hole group and the second hole group include a plurality of holes according to an embodiment.

Further, referring to the structural schematic diagram of another embodiment in which the first hole group and the second hole group include a plurality of holes shown in FIG. 17. The first hole group 5 may include two first holes 51, and the two first holes 51 may be arranged along the width direction of the first hole group 5. The cross sections of the first holes 51 may also be rectangular. The two rectangles may have the same length and may have the same or different widths. Of course, the first hole group 5 can also include three, five or more first holes 51, and the cross section of the first hole 51 can also be elliptical, or parallelogram, etc. The second hole group 9 may include two second holes 91, and the two second holes 91 may be arranged along the width direction of the second hole group 9. The cross sections of the second holes 91 may also be rectangular. The two rectangles may have the same length and may have the same or different widths. Of course, the second hole group 9 can also include three, five or more second holes 91, and the cross section of the second hole 91 can also be elliptical, or parallelogram, etc.

In addition, it should be understood that the first hole group 5 and the second hole group 9 may be the same or different. The first hole 51 and the second hole 91 may also the same or different.

In this embodiment, the first hole groups 5 are provided in a side of an anti-crack dam away from a display area, and the second hole groups 9 are provided in the side of the anti-crack dam away from the display area. That is, the flexible display panel may include a display area and a non-display area provided around the display area, an anti-crack dam is provided in the non-display area, the first hole group 5 and the second hole group 9 are provided in the non-display area of the corner bending area, and both the first hole group 5 and the second hole group 9 are disposed on the side of the anti-crack dam away from the display area.

Figure 19:
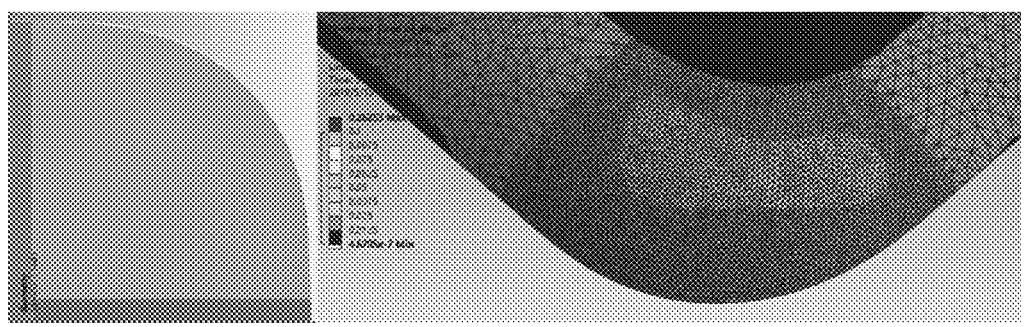
FIG. 19 is a simulation schematic diagram of the strain distribution in an unperforated corner bending area of the flexible display panel after the lamination is completed.
Figure 20:
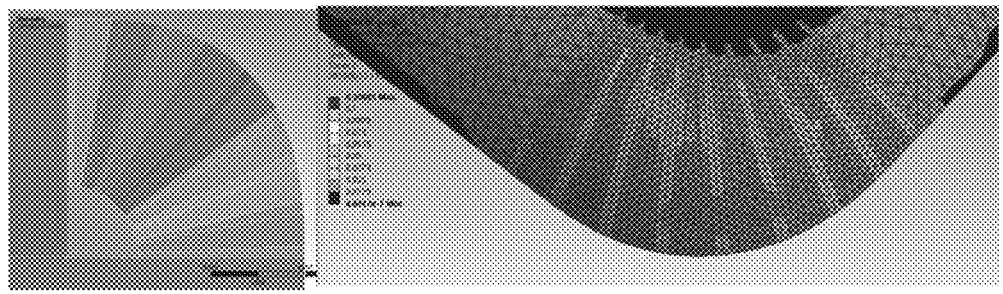
FIG. 20 is a simulation schematic diagram of the strain distribution in the corner bending area of the flexible display panel of the present application provided with the first hole group after the lamination is completed.
Figure 21:
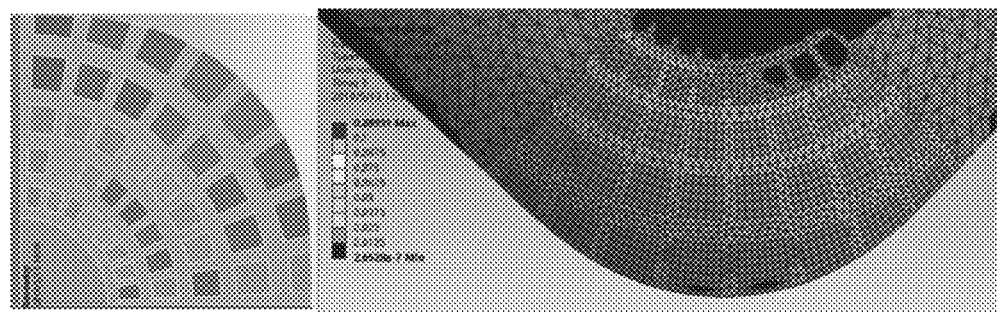
FIG. 21 is a simulation schematic diagram of the strain distribution in the corner bending area of the flexible display panel of the present application provided with the first hole group and the second hole group after the lamination is completed.

Referring to a simulation schematic diagram of the strain distribution of an unperforated corner bending area 3 of the flexible display panel after the lamination is completed shown in FIG. 19, this figure illustrates that the strain is concentrated in the middle area of the corner bending area 3. Referring to a simulation schematic diagram of the strain distribution of the corner bending area 3 of the flexible display panel provided with the first hole group after the lamination is completed shown in FIG. 20, this figure illustrates that the corner bending area 3 is composed of many small sectors along the radial direction, with the wider small sectors having a larger elastic modulus to simulate the non-perforated areas and the narrower small sectors having a smaller elastic modulus to simulate the perforated areas. After the lamination is completed, the perforated area bears the large deformation of the screen, and the non-perforated area is less deformed and thus protected. Referring to a simulation schematic diagram of the strain distribution in the corner bending area of the flexible display panel of the present application provided with the first hole group and the second hole group after the lamination is completed shown in FIG. 21, the corner bending area 3 has a network structure composed of many narrow strips intersecting in the radial direction and the tangential direction. The network structure has a small elastic modulus to simulate the first hole group 5 and the second hole group 9 areas, and the small trapezoids surrounded by the network structure have a larger elastic modulus to simulate the non-perforated areas. After the lamination is completed, the first hole group 5 and the second hole group 9 areas bear the large deformation of the flexible display panel, and the non-perforated areas are less deformed and thus protected.

The flexible display panel of the present application absorbs larger tensile and compressive strains through the tensile and compressible deformation of the first hole group to reduce the lamination stress and strain in the non-perforated area of the flexible display panel, which in turn reduces the cracks in the lamination and the wrinkles in the edge of the flexible display panel. Moreover, even if the edge of the flexible display panel is in contact with the cover first, and then the inside is in contact, air will be released through the first hole group 5 without generating air bubbles.

The present application further provides a display device, which may include the flexible display panel as described in any one of the above. The specific structure of the flexible display panel has been described in detail above; therefore, it will not be repeated here.

The specific type of the display device is not particularly limited, and any type of display device commonly used in the field can be used, for example, OLED displays, mobile devices such as cell phones, wearable devices such as watches, VR devices and so on. A person skilled in the art may choose the display device according to the specific use of the display device, and will not repeat here.

It should be noted that the display device, in addition to the flexible display panel, also includes other necessary components and compositions. Taking the display as an example, it may further include, in particular, a housing, a circuit board, a power cord, etc., which may be supplemented by a person skilled in the art according to the specific requirements of the use of the display device, and will not be repeated here.

Compared with the prior art, the beneficial effects of the display device provided by the embodiments of the present application are the same as those of the flexible display panel provided by the above-mentioned embodiments, which will not be repeated here.

The present application further provides a method for preparing a flexible display pane, which may include the following steps.

In a process for forming the flexible display panel, a plurality of first hole groups are formed in the corner bending area by two etching processes, where the corner bending area is bent with a width of a first hole group in middle of the corner bending area increasing and a width of a first hole group in an edge area on a side of the corner bending area away from the planar area decreasing.

Figure 22:
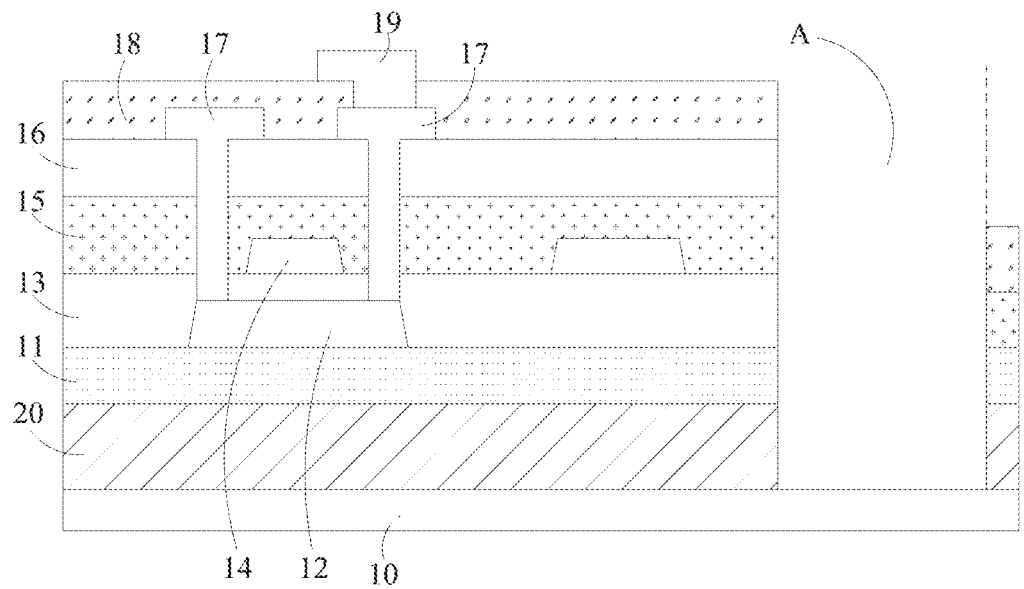
FIG. 22 is a schematic cross-sectional view of the flexible display panel of the present application.

Specifically, referring to FIG. 22, this figure only indicates the depth of the first hole group 5 and the second hole group 9, that is, the first hole group 5 and the second hole group 9 through which film layer, the locations of which in the plane has been detailed above and will not be repeated here. The area referred to by A in the figure is the perforated area, and the depth of the area A indicates the depth of the first hole group 5 and the second hole group 9. A flexible substrate 20, a blocking layer group 11 (first blocking layer, second blocking layer, and buffer layer), an active layer 12, a first gate insulating layer 13, a gate 14, a second gate insulating layer 15, and a interlayer dielectric layer 16 can be formed on a glass carrier 10, and then the first mask (Etch Bending A MASK, or EBA MASK) is applied to the corner bending area (i.e., the perforated area A) to remove the first gate insulating layer 13, the second insulating layer 15, and the interlayer dielectric layer 16, and the second mask (Etch Bending B MASK, or EBB MASK) is applied to the corner bending area 3 to form a plurality of first via holes on the first blocking layer, the second blocking layer, and the buffer layer; source and drain electrodes 17 are formed in the display area; a planarization layer 18 is formed, and then the planarization layer 18 and the flexible substrate 20 in the corner bending area 3 are then perforated to form a plurality of second via holes or second blind holes. The plurality of second via holes or second blind holes are connected to the plurality of first via holes to form the first hole group 5 and the second hole group 9. In the other embodiments of the present application, the first hole group 5 and the second hole group 9 may penetrate through all the insulating layer, passivation layer, planarization layer, buffer layer, protective layer, and interlayer dielectric layer, etc., located in the corner bending area 3. The width of the first hole group 5 in the middle of the corner bending area 5 increases after the corner bending area 3 is bent, and the width of the first hole group 5 in the edge area of the corner bending area 3 decreases.

Finally, the flexible display panel is formed by forming an anode 19, a pixel definition layer, a light-emitting layer, a cathode, and an encapsulation layer, etc. in turn.

The embodiments further provide a display module that may include a cover, a carrier film and a flexible display panel as described in any of the above. The carrier film is used to carry the flexible display panel when the flexible display panel is laminated to the cover.

Figure 23:
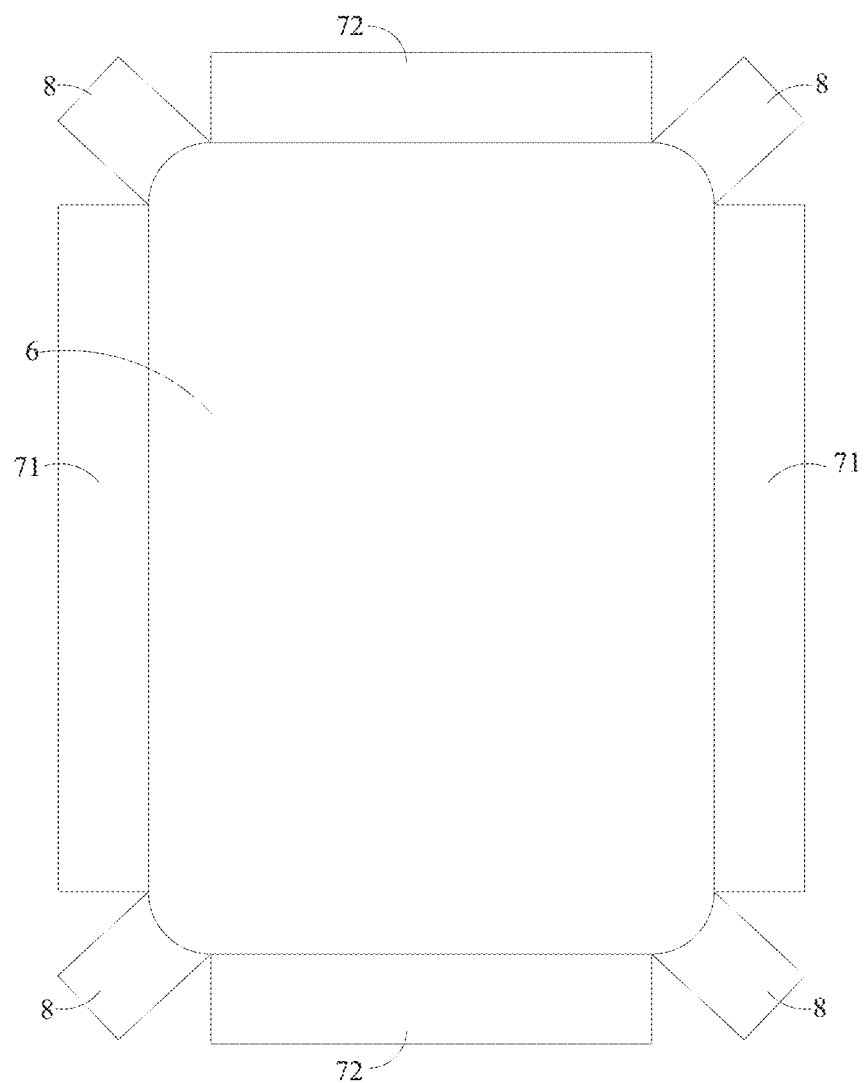
FIG. 23 is a structural schematic diagram of a carrier film of the display module of the present application according to an embodiment.

Referring to FIG. 23, the carrier film may include a plane carrying area first bending and carrying area 71, a second bending and carrying area 72, and a corner bending and carrying area 8. The plane carrying area 6 is used for carrying the planar area 1 of the flexible display panel. The first bending and carrying area 71 is connected to the edge of the plane carrying area 6 along the first direction, and can be used for carrying the first bending area 21 of the flexible display panel. The second bending and carrying area 72 is connected to the edge of the plane carrying area 6 along the second direction, and is used for carrying the second bending area 22 of the flexible display panel, the second direction being at a set angle to the first direction. The corner bending and carrying area 8 is connected to the corner of the plane carrying area 6, and is used for carrying the corner bending area. 3 of the flexible display panel, where a space is provided between the corner bending and carrying area and the first bending and carrying area 71, and a space is provided between the corner bending and carrying area and the second bending and carrying area 72.

In this embodiment, the plane carrying area 6 can be set as a rectangle with rounded corners, and the plane carrying area 6 carries the planar area 1 of the flexible display panel without bending. The plane carrying area 6 has four straight edges and four arc-shaped edges. The four straight edges can be two long edges and two wide edges.

The four straight edges of the plane carrying area 6 are connected with two first bending and carrying areas 71 and two second bending and carrying areas 72. The first bending and carrying area 71 can be a long-edge bending and carrying area, the first edge of the plane carrying area 6 can be the long edge of the plane carrying area 6, and the first direction can be the length direction of the plane carrying area 6. Two first bending and carrying area 71 are connected to the two first edges of the plane carrying area 6 along the first direction, that is, two first bending and carrying area 71 are connected to the two long edges of the plane carrying area 6 along the length direction. The second bending and carrying area 72 can be a wide-edge bending and carrying area, the second edge can be the wide edge of the plane carrying area 6, and the second direction can be the width direction of the plane carrying area 6. Two second bending and carrying areas 72 are connected to the two second edges of the plane carrying area 6 along the second direction, that is, two second bending and carrying areas 72 are connected to the two wide edges of the plane carrying area along the width direction.

The width of the first bending and carrying area 71 and the second bending and carrying area 72 is the same, the length of the first bending and carrying area 71 is the same as the length of the first edge, and the length of the second bending and carrying area 72 is the same as the length of the second edge.

The length of the plane carrying area 6 can be equal to the length of the planar area 1, and the width of the plane carrying area 6 can be equal to the width of the planar area 1.

The length of the first bending and carrying area 71 can be equal to or greater than the length of the first bending area 21, and the width of the first bending and carrying area 71 can be greater than the width of the first bending area 21, so as to facilitate holding the first bending and carrying area 71 with a clip. The width of the second bending and carrying area 72 can be greater than the width of the second bending region 22, to facilitate the holding of the edge of the second bending and carrying area 72 with a clip.

Of course, it should be understood that the plane carrying area 6 can be set as a right-angle rectangle, a rounded square, a right-angle square, etc. consistent with the flexible display panel, and can also be set as a trapezoid, a parallelogram, etc. as required.

In this embodiment, the corner bending and carrying area 8 is connected to the corner of the plane carrying area 6, that is, the corner bending and carrying area 8 is connected to the arc-shaped edge of the plane carrying area 6. Specifically, the corner bending and carrying area 8 can be set as a rectangle with a curve on one side, and the curve is connected with the arc-shaped edge of the plane carrying area 6, and the straight edges on both sides of the curve form an angle with the first bending area 21 and the second bending area 22. The length of the corner bending and carrying area 8 is greater than the length of the corner bending area 3, convenient to use the clip to hold the edge of the corner bending and carrying area 8.

In addition, it should be noted that in the case where the plane carrying area 6 can be set as a right-angle rectangle, a right-angle square, a trapezoid, a parallelogram, etc., the corner bending and carrying area 8 can be set as a sector, a parallelogram or a square.

Figure 24:
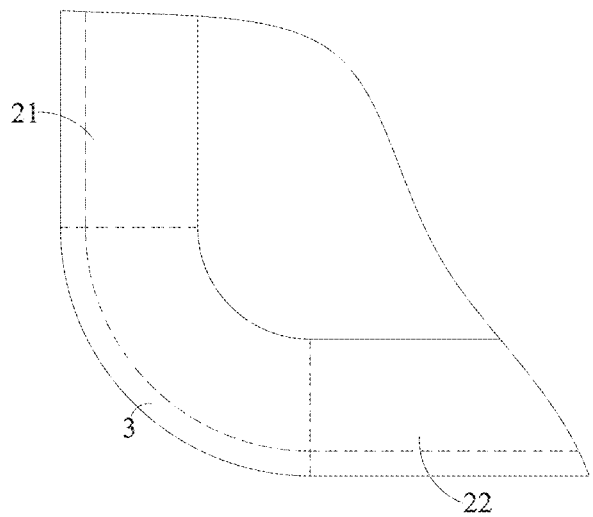
FIG. 24 is a schematic diagram comparing the edge position of the flexible display panel with and without the tension of the carrier film.
Figure 25:
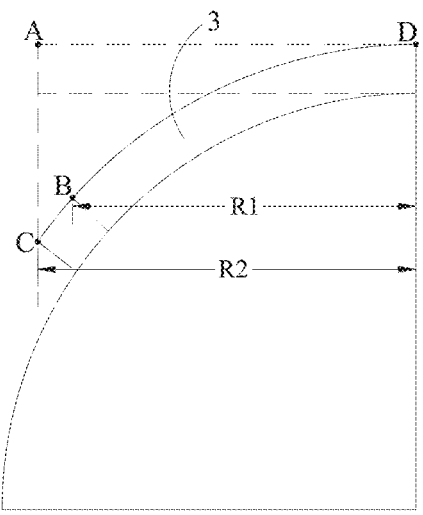
FIG. 25 is a schematic cutaway view of FIG. 24.

Referring to the structural schematic diagram comprising the edge position of the flexible display panel with and without the tension of the carrier film shown in FIG. 24 and FIG. 25, point B indicates the edge position of the corner bending area of the flexible display panel when it is attached to the sphere of the four corners of the cover and there is no tension of the carrier film in the corner bending area, where DA=DB and the length of the edge curve of the corner bending area is less than the length of the curve of the corner bending area before lamination, which is under pressure and easy to produce wrinkles. Point C indicates the edge position of the corner bending area when it is attached to the sphere of the four corners of the cover and there is a tension of the carrier film in the corner bending area. In the figures, R1 indicates the radius of the edge of the corner bending area when it is attached to the sphere without the tension of the carrier film, and R2 indicates the radius of the circumference of the edge of the corner bending area when it is attached to the sphere with the tension of the carrier film, in which case the corner bending area is not easy to produce wrinkles after being stretched.

The features, structures, or characteristics described above may be combined in any appropriate manner in one or more embodiments, and the features discussed in the various embodiments are interchangeable, if possible. In the above description, many specific details are provided thereby giving a full understanding of the embodiments of the present application. However, those skilled in the art will understand that it is possible to practice the technical embodiments of the present application without one or more of the specific details described, or that other methods, components, materials, etc. may be employed. In other instances, well-known structures, materials, or operations are not shown or described in detail to avoid obscuring aspects of the present application.

Although relative terms such as "up" and "down" are used in this specification to describe the relative relationship of one component of the reference numeral to another, these terms are used in this specification only for convenience, for example, according to the orientation of the examples described in the accompanying drawings. It should be understood that if the device indicated by the reference numeral is flipped so that it is upside down, the component described as being "up" will become the component described as being "down". When a structure is "on" other structures, it may mean that a structure is integrally formed on other structures, or that a structure is "directly" set on other structures, or that a structure is "indirectly" set on other structures through another structure.

In this specification, the terms "one", "a", "the", "said" and "at least one" are used to indicate the presence of one or more elements/'components/etc. The terms "comprises", "includes" and "has" are used to indicate an open-ended inclusion and to mean that additional elements/components/ etc. may exist in addition to those listed elements/components/etc. The terms "first", "second", and "third" are used only as marks and are not intended to limit the number of objects thereof.

It should be understood that the present disclosure does not limit its application to the detailed construction and arrangement of the components presented in this specification. The present disclosure can have other embodiments and can be realized and performed in a variety of ways. The aforementioned variant and modified firms fall within the scope of the present disclosure. It should be understood that the present application as disclosed and limited by this specification extends to all alternative combinations of two or more individual features mentioned or apparent in the text and/or the accompanying drawings. All such different combinations constitute multiple alternative aspects of the present application. The embodiments described in this specification illustrate the best manner known for implementing the present application and will enable those skilled in the art to utilize the application.

What is claimed is:

1. A flexible display panel, comprising:
   a planar area;
   a first bending area connected to a first edge of the planar area along a first direction;
   a second bending area connected to a second edge of the planar area along a second direction, the second direction being at a set angle to the first direction; and
   a corner bending area connected to a corner of the planar area and connected between the first bending area and the second bending area, and provided with a plurality of first hole groups, wherein the corner bending area is bent with a width of a first hole group in middle of the corner bending area increasing and a width of a first hole group in an edge area on a side of the corner bending area away from the planar area decreasing; wherein the corner bending area is further provided with a plurality of second hole groups, the corner bending area is bent with a width of a second hole group in the middle of the corner bending area increasing and a width of a second hole group in the edge area of the corner bending area increasing; and wherein the first hole group extends in a third direction, and the second hole group extends in a fourth direction, the third direction intersecting the fourth direction.

2. The flexible display panel of claim 1, wherein the plurality of first hole groups are arranged in a plurality of rows, each row of first hole groups being arranged in a same direction as an extension direction of an edge of a side, away from the planar area, of the corner bending area.

3. The flexible display panel of claim 2, wherein the corner bending area is provided in a sector shape or a partial annular shape; and a first hole group is provided in a strip shape, a length direction of the first hole group is consistent with a radial direction of the corner bending area, and at least one pixel is provided on one side of the first hole group in a width direction.

4. The flexible display panel of claim 3, wherein first center lines of two first hole groups adjacent to each other in the radial direction are aligned in the same radial direction or staggered with each other, the first center lines extending in a same direction as the length direction of the two first hole groups.

5. The flexible display panel of claim 3, wherein
   a second hole group is provided in a strip shape, and a second center line of the second hole group is consistent with the radial direction and extends in a same direction as a width direction of the second hole group.

6. The flexible display panel of claim 5, wherein the plurality of second hole groups are arranged in a plurality of rows, each row of second hole groups being arranged in a same direction as the extension direction of the edge of the side, away from the planar area, of the corner bending area.

7. The flexible display panel of claim 5, wherein the second center lines of two second hole groups adjacent to each other in the radial direction are aligned in the same radial direction or staggered with each other.

8. The flexible display panel of claim 5, wherein
a width of a first hole group in the middle and the edge area of the corner bending area is greater than a width of a first hole group in remaining part of the corner bending area other than the middle or the edge area of the corner bending area; and/or
a width of a second hole group in the middle and the edge area of the corner bending area is greater than a width of a second hole group in remaining part of the corner bending area other than the middle or the edge area of the corner bending area.

9. The flexible display panel of claim 5, wherein
a density of first hole groups in the middle and the edge area of the corner bending area is greater than a density of first hole groups in remaining part of the corner bending area other than the middle or the edge area of the corner bending area; and/or
a density of second hole groups in the middle and the edge area of the corner bending area is greater than a density of second hole groups in remaining part of the coiner bending area other than the middle or the edge area of the corner bending area.

10. The flexible display panel of claim 5, wherein two first hole groups adjacent to each other in a tangential direction and two second hole groups adjacent to each other in the radial direction surround to form a trapezoid.

11. The flexible display panel of claim 5, wherein the first hole group comprises one first hole, a cross section of the first hole being rectangular, elliptical or trapezoidal; and the second hole group comprises one second hole, a cross section of the second hole being rectangular, elliptical or trapezoidal.

12. The flexible display panel of claim 5, wherein the first hole group comprises a plurality of first holes arranged along the length direction of the first hole group, a cross section of a first hole being circular, rectangular or elliptical; and the second hole group comprises a plurality of second holes arranged along the length direction of the second hole group, a cross section of a second hole being circular, rectangular or elliptical.

13. The flexible display panel of claim 5, wherein the first hole group comprises a plurality of first holes arranged along the width direction of the first hole group, a cross section of a first hole being rectangular or elliptical; and the second hole group comprises a plurality of second holes arranged along the width direction of the second hole group, a cross section of a second hole being rectangular or elliptical.

14. The flexible display panel of claim 5, wherein
the width of the second hole group is greater than or equal to 5 μm and less than or equal to 20 μm;
a length of the second hole group is greater than or equal to 100 μm and less than or equal to 1000 μm;
a depth of the second hole group is greater than or equal to 20 μm and less than or equal to 60 μm;
a distance between two second hole groups adjacent to each other in the radial direction is greater than or equal to 150 μm and less than or equal to 1200 μm; and
a distance between two second hole groups adjacent to each other in a tangential direction is greater than or equal to 150 μm and less than or equal to 1200 μm.

15. The flexible display panel of claim 5, wherein the plurality of first hole groups are provided in a side of an anti-crack dam away from a display area, and the plurality of second hole groups are provided in the side of the anti-crack darn away from the display area.

16. The flexible display panel of claim 3, wherein
the width of the first hole group is greater than or equal to 5 μm and less than or equal to 20 μm;
a length of the first hole group is greater than or equal to 100 μm and less than or equal to 1000 μm;
a depth of the first hole group is greater than or equal to 20 μm and less than or equal to 60 μm,
a distance between two first hole groups adjacent to each other in the radial direction is greater than or equal to 150 μm and less than or equal to 1200 μm; and
a distance between two first hole groups adjacent to each other in a tangential direction is greater than or equal to 150 μm and less than or equal to 1200 μm.

17. The flexible display panel of claim 1, wherein first hole groups close to an edge of the flexible display panel are channeled to the edge of the flexible display panel to form a plurality of notches at the edge of the flexible display panel.

18. A display device, comprising a flexible display panel, wherein the flexible display panel comprises:
a planar area;
a first bending area connected to a first edge of the planar area along a first direction;
a second bending area connected to a second edge of the planar area along a second direction, the second direction being at a set angle to the first direction; and
a corner bending area connected to a corner of the planar area and connected between the first bending area and the second bending area, and provided with a plurality of first hole groups, wherein the corner bending area is bent with a width of a first hole group in middle of the corner bending area increasing and a width of a first hole group in an edge area on a side of the corner bending area away from the planar area decreasing.

19. A method for preparing the flexible display panel of claim 1, wherein the method comprises:
forming a plurality of first hole groups and a plurality of second hole groups in the corner bending area by two etching processes, wherein the corner bending area is bent with a width of a first hole group in middle of the corner bending area increasing and a width of a first hole group in an edge area on a side of the corner bending area away from the planar area decreasing;
wherein the corner bending area is bent with a width of a second hole group in the middle of the corner bending area increasing and a width of a second hole group in the edge area of the corner bending area increasing; and
wherein the first hole group extends in a third direction, and the second hole group extends in a fourth direction, the third direction intersecting the fourth direction.

20. A display module, comprising:
a cover;
a flexible display panel, wherein the flexible display panel comprises: a planar area; a first bending area connected to a first edge of the planar area along a first direction; a second bending area connected to a second edge of the planar area along a second direction, the second direction being at a set angle to the first direction; and a corner bending area connected to a corner of the planar area and connected between the first bending area and the second bending area, and provided with a plurality of first hole groups, wherein the corner bending area is bent with a width of a first hole group in middle of the corner bending area increasing and a width of a first hole group in an edge area on a side of the corner bending area away from the planar area decreasing: wherein the corner bending area is further provided with a plurality of second hole groups, the corner bending area is bent with a width of a second hole group in the middle of the corner bending area increasing and a width of a second hole group in the edge area of the corner bending area increasing; and wherein the first hole group extends in a third direction, and the second hole group extends in a fourth direction. the third direction intersecting the fourth direction; and a carrier film for carrying the flexible display panel when the flexible display panel is laminated to the cover, wherein the carrier film comprises:

a plane carrying area for carrying the planar area of the flexible display panel;

a first bending and carrying area connected to a first edge of the plane carrying area in a first direction, for carrying the first bending area of the flexible display panel;

a second bending and carrying area connected to a second edge of the plane carrying area in a second direction, for carrying the second bending area of the flexible display panel, the second direction being at a set angle to the first direction; and a corner bending and carrying area connected to a corner of the plane carrying area, for carrying the corner bending area of the flexible display panel, wherein a space is provided between the corner bending and carrying area and the first bending and carrying area, and a space is provided between the corner bending and carrying area and the second bending and carrying area.

* * * * *